UNITED STATES PATENT OFFICE.

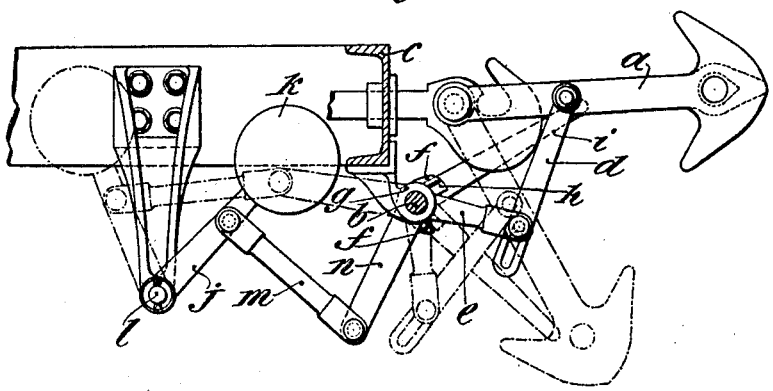

LUDWIG MATIÁSZ OROSZ, OF ARAD, AUSTRIA-HUNGARY, ASSIGNOR OF ONE-HALF TO DANIEL NEUMAN, OF ARAD, AUSTRIA-HUNGARY.

AUTOMATIC COUPLING FOR RAILWAY-VEHICLES.

No. 856,418.     Specification of Letters Patent.     Patented June 11, 1907.

Application filed January 13, 1906. Serial No. 295,940.

*To all whom it may concern:*

Be it known that I, LUDWIG MATIÁSZ OROSZ, a subject of the King of Hungary, and a resident in the city of Arad, in the Empire of Austria-Hungary, have invented certain new and useful Improvements in Automatic Couplings for Railway-Vehicles, of which the following is a specification.

This invention relates to automatic couplings for railway vehicles, and particularly to that class of coupling in which a weighted pivoted lever, according to its position at one or other side of its dead center, maintains the parts of the coupling in the coupling or uncoupled position respectively, and is designed to obviate the necessity of independent means for securing the lever in either terminal position, to provide means for maintaining the coupling securely in both terminal positions, to avoid any possibility of jerks or jolts swinging or bending the weighted lever or shaking it out of position when set until it is released and to permit of the non-automatic coupling and uncoupling of the vehicles if desired.

The accompanying drawings show one form of the invention.

Figure 1. is a side view showing the apparatus in the coupling position and in dotted lines in the uncoupled position. Fig. 2 is a plan of the apparatus in the coupling position.

The weighted lever $j$ which according to its position maintains the coupling hook $a$ jointed to the draw hook in the coupling or uncoupled position is mounted on a horizontal pivot $l$ carried by a bracket under the frame of the wagon, and so arranged that the weight $k$ is above the pivot $l$ and not hanging below it as hitherto. The weighted lever $j$ is connected by a link or connecting rod $m$ with a lever or arm $n$ keyed on the operating rod $b$ mounted on the draw beam $c$, in such a way that when the rod $b$ is rotated into the coupling position the weight $k$ is drawn or swung forward some distance in front of the dead point and toward the draw beam $c$ thereby raising the coupling hook $a$ and keeping it raised and so that when the operating rod $b$ is turned into the uncoupled position the weight $k$ is raised and swung backward to a short distance behind the dead point.

The coupling hook $a$ is lifted and lowered by means of a rod or link $d$ connected to the lever $e$ rigidly mounted upon the operating rod or shaft $b$. The pivot connecting the link $d$ and lever $e$ passes through a slot in the end of the lever $d$ in which it is free to slide.

The shaft $b$ is mounted in bearings $g$ preferably carried by the draw beam $c$ and provided at one or both ends with a handle $i$ for operating it and the bearings $g$ are formed with stops $f$ which engage corresponding projections or stops on the shaft $b$ to restrict the movement of the shaft.

The operation of the coupling is as follows:—When two vehicles are to be coupled the handles $i$ at either end of the shafts $b$ of the two couplings are raised from the dotted position shown in Fig. 1, to that shown in full lines when further rotation is stopped by the projections $h$ on the handles $i$ engaging the stops $f$. The rotation of the shafts $b$ raises the levers $e$ and with them the links $d$ and coupling hooks $a$, and at the same time by means of the lever $n$ and links $m$ pulls over the levers $j$ and weights $k$ till the resultant leverage of the weights $k$ is considerably more than sufficient to permit them to counterbalance the weights of the hooks $a$. The vehicles are then run together and the slots in the ends of the levers $d$ permit the extremities of each hook $a$ to ride over the draw-bar of the other hook and enter into engagement therewith. When the vehicles are to be uncoupled the shafts $b$ of the two couplings are rotated into the position shown in dotted lines in Fig. 1. by the handles $i$ when further rotation is prevented by the projections $h$ engaging the lower stops $f$ of the bearings $g$. This rotation of the shafts $b$, by means of the levers $n$ and links $m$ raises the weights $k$ and pushes them back a short distance beyond their dead centers and raises the connections between levers $n$ and links $m$ above the dead point so that the weights $k$ cannot be jolted forward. At the same time the rotation of the shafts $b$ lowers and disengages the hooks $a$ by means of the levers $e$ and links $d$ and, due to the position of the weights $k$ beyond the dead centers, the weight of the hooks $a$ also acts to maintain the weights in position and to prevent them being jolted forward.

What I claim as my invention and desire to protect by Letters Patent is:—

1. In a coupling for railway and like vehicles the combination with the draw-beam, of an operating shaft a handle to rotate same, a weighted lever pivoted to the wagon independently of the operating shaft, a lever on the operating shaft, a link connecting said lever and said weighted lever, a draw-hook mounted on the draw beam, a second lever on the operating shaft a link connecting said second lever with the draw-hook and stops to restrict the rotation of the operating lever substantially as hereinbefore described.

2. In a coupling for railway and like vehicles the combination with the draw-beam, of an operating shaft, a handle to rotate same, a lever pivoted at its lower end to the frame of the wagon, a weight upon the upper end of said lever, a lever on the operating shaft, a link connecting said lever and said weighted lever, and adapted on the rotation of the operating shaft to move said weighted lever from one side to the other of its dead center, a draw-hook mounted on the draw beam, a second lever on the operating shaft a link connecting said second lever with the draw-hook and stops to restrict the rotation of the operating lever substantially as hereinbefore described.

In witness whereof, I have hereunto signed my name in the presence of two subscribing witnesses.

LUDWIG MATIÁSZ OROSZ.

Witnesses:
   JULIUS RÉVI,
   F. C. MALLETT